May 21, 1968     J. A. STEWART ETAL     3,384,817

FREQUENCY METER USING TRANSISTOR SWITCHED FIELD COIL

Filed July 2, 1965     2 Sheets-Sheet 1

INVENTORS
John A. Stewart, &
BY John Richard Ziegler

Hugh L. Fisher
ATTORNEY

May 21, 1968  J. A. STEWART ET AL  3,384,817
FREQUENCY METER USING TRANSISTOR SWITCHED FIELD COIL
Filed July 2, 1965  2 Sheets-Sheet 2

INVENTORS
John A. Stewart, &
BY John Richard Ziegler

Hugh L. Fisher
ATTORNEY

United States Patent Office 3,384,817
Patented May 21, 1968

3,384,817
FREQUENCY METER USING TRANSISTOR
SWITCHED FIELD COIL
John A. Stewart and John R. Ziegler, Flint, Mich., assignors to General Motors Corporation, Detroit, Mich., a corporation of Delaware
Filed July 2, 1965, Ser. No. 469,191
3 Claims. (Cl. 324—70)

ABSTRACT OF THE DISCLOSURE

Frequency meter circuits of the type using field coils, at least one of which receives a variable current. To produce the variable current, an input switch opens and closes at the rate to be metered to charge and discharge a capacitor which controls the conductivity of a transistor connected in series with the coil and a DC source. In an alternate embodiment, a second transistor operates complementally with the first to vary current through a second coil.

SUMMARY OF THE INVENTION

This invention relates to electrical apparatus for indicating the rate of occurrence of an event and more particularly to apparatus for accomplishing such an end by producing a magnetic field the resultant angular orientation of which varies according to the rate of occurrence of the event.

Rate indicators of the type used as speedometers and tachometers often employ a flexible mechanical connection between the source of events to be monitored and the point of display. This mechanical connection imposes limitations on the allowable distance between the pickup and display points and further limits the nature of the path which the connection must take inasmuch as it cannot tolerate a sharp angle. Further, such mechanical connections require a certain amount of maintenance such as lubrication and replacement. Therefore, it has been found to be desirable to eliminate this mechanical connection and to replace it with a simple electrical connection. One rate indicating device in which this substitution may be accomplished employs a synchronous motor at the display end, which motor is driven by incoming electrical signals which are generated at the pickup point. The device further employs the conventional magnetic drag cup mechanism which when driven by the motor angularly orients a pointer.

It is an object of the present invention to provide an electrical rate indicating apparatus which is particularly but not exclusively adaptable for use a speedometer or tachometer and which does not require the conventional synchronous motor drag cup mechanism.

A more specific object of the present invention is to indicate the rate of occurrence of an event through the generation of a magnetic field the resultant angular orientation of which varies according to the rate of occurrence of the event. In general this may be accomplished by the combination of generator means responsive to the occurrence of the event to be monitored to produce a signal pulse such as an electrical voltage of fixed predetermined width at a rate which is related to the rate of occurrence of the event; e.g., upon each occurrence. The combination further includes a field coil which is connected to receive the voltage pulses from the generator and responsive to these pulses to produce a magnetic field of an orientation which is determined by the disposition of the field coil and which magnetic field has a magnitude which varies according to the average value of the output of the generator means and therefore according to the rate of occurrence of the pulses.

In a preferred embodiment, the angular orientation of the magnetic field which is produced by the aforementioned combination of elements may be indicated by armature means which may be rotatably mounted proximate the coil so as to be angularly oriented with the field to a degree which is related to the magnitude of the field; i.e., the greater the magnitude of the field the more aligned therewith becomes the armature means. Further means such as a pointer may be motivated by the armature, either directly or through intermediate means, for indicating the alignment of the armature.

As previously mentioned, the combination described above and the specific embodiments further described in the following specification may be employed as a means for generally indicating the rate of occurrence of any event. However, the invention is particularly adaptable for use as a speedometer measuring the rate of travel of a vehicle or as a tachometer in measuring the speed at which a motive power means is operating.

The invention may be best understood by reference to the following description of specific embodiments of the invention. This description is to be taken with the accompanying figures of which:

Figure 1:
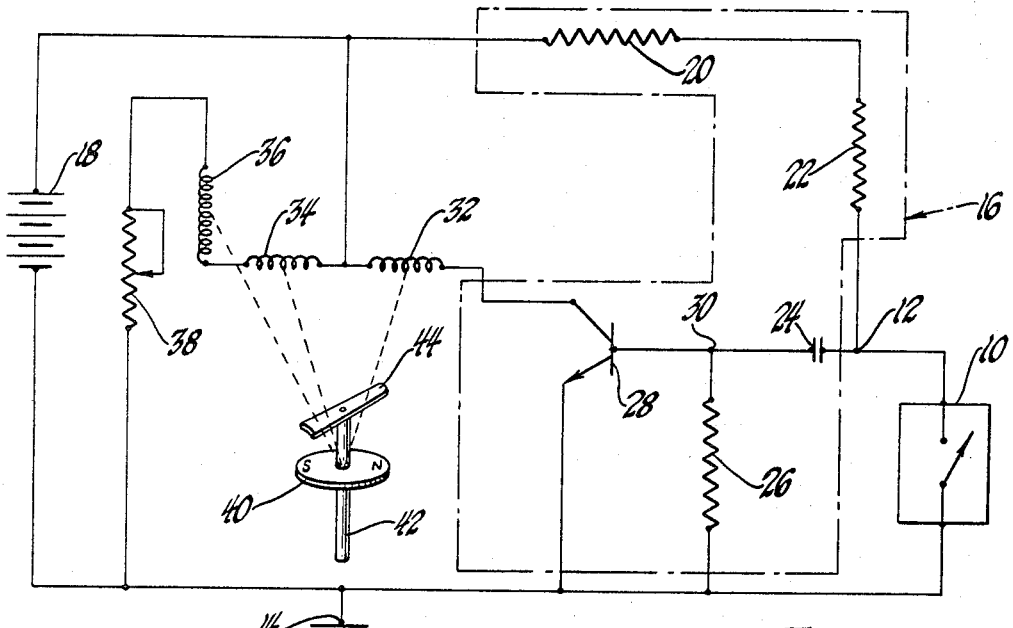
FIGURE 1 is a schematic diagram of a first embodiment of the invention.

Referring now to FIGURE 1, the first embodiment of the invention is shown to include an input switching device 10 which is adapted to be transferred between two operating states or conditions. The input device 10 is shown diagrammatically as a simple switch which is capable of assuming a first open condition or a second closed condition and may be transferred between the conditions by the occurrence of an event being monitored. Where the embodiment of FIGURE 1 is being employed as a speedometer, the input switching device 10 may take the form of an inductive pickup. Alternatively, if the embodiment of FIGURE 1 is to be employed as a tachometer, the input switching device 10 may take the form of a simple rotating mechanical switch which is rotated in correspondence with engine revolutions. Further, the input device 10 may take various other forms as will be apparent to those skilled in the art. The input device 10 is connected across an input terminal 12 of a square wave generator 16 and a reference point 14 shown in FIGURE 1 as ground. The square wave generator 16 is adapted to produce voltage pulses of a fixed width upon the transfer of the input switching device 10 from the second or closed condition to the first or open condition. To accomplish this the square wave generator 16 includes, in combination with a DC voltage source 18, the series combination of resistors 20 and 22, a capacitor 24 and a resistor 26. The resistor 26 is connected to ground point 14 as shown, and resistor 20 is connected to the positive terminal of source 18. The negative terminal of source 18 is connected to ground as shown. It may be seen that an RC charging circuit is formed by the series combination of source 18, resistors 20 and 22, capacitor 24 and resistor 26. The charging time of this RC circuit is determined by the parameters of the resistors 20, 22 and 26 and capacitor 24.

As shown in FIGURE 1, the input switching device 10 is connected across that portion of the RC charging circuit as defined by the series combination of capacitor 24 and resistor 26. When input device 10 is in the first or open condition, source 18 is effective to produce current which flows through the combination of capacitor 24 and resistor 26 charging capacitor 24. When input switching device 10 is in the second or closed condition, a discharge path is set up through the switching device 10 which abruptly discharges capacitor 24 through switching device 10 to ground 14.

Figure 2:
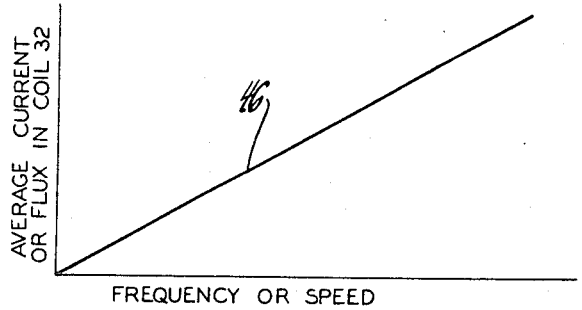
FIGURE 2 is a graphical representation of the average current or flux in the variable field coil of the embodiment of FIGURE 1 as a function of the rate of occurrence of an event being monitored.

The square wave generator 16 includes a transistor stage 28 having the base electrode thereof connected to the junction 30 between the capacitor 24 and resistor 26. Thus connected, the conductivity of the transistor is controlled by the voltage variations on capacitor 24 to produce signals of fixed duration corresponding to the charging time of the RC circuit including capacitor 24 and resistor 26. The emitter of transistor 28 is connected to ground while the collector is connected through a variable field coil 32 to the positive terminal of source 18. Accordingly, the signal pulses produced by controlling the conductivity of transistor 28 flow through the path defined as follows: the positive terminal of source 18, field coil 32, the collector to emitter circuit of transistor 28 to ground 14. These signal pulses produce current flow through field coil 32 which varies in average magnitude according to the rate of occurrence of pulses from the square wave generator 16. Accordingly, the magnitude of the magnetic flux field produced by field coil 32 varies according to the rate of occurrence of the output pulses from square wave generator 16 as shown in FIGURE 2.

The circuit of FIGURE 1 further includes a pair of reference coils 34 and 36. The series combination of coils 34 and 36 and an adjustable resistor 38 is connected across source 18. Coil 34 is oriented such that the magnetic field produced thereby is in direct opposition to that produced by coil 32. Coil 36 is oriented such that the reference magnetic field produced thereby is aligned or oriented angularly intermediate and at right angles to the opposing fields produced by coils 32 and 34. A magnetic armature indicated in FIGURE 1 at 40 is rotatably mounted on an axle 42 so as to be angularly oriented according to the resultant flux vector of the magnetic fields produced by coils 32, 34 and 36. The axle 42 further carries a pointer 44 which rotates in accordance with the angular orientation of armature 40 to indicate the direction of alignment of the resultant flux vector produced by coils 32, 34 and 36.

The operation of the embodiment of FIGURE 1 is described in the following with reference to FIGURES 2 and 3. Assuming that the input switching device 10 is first placed in the first or open condition, current flows from the positive terminal of source 18 through the series combination of resistors 20 and 22, capacitor 24 and resistor 26 to ground 14, charging capacitor 24. This charging current places a forward bias on the base electrode of transistor 28 causing the transistor to conduct for a period corresponding to the major portion of the charging time of the RC circuit including capacitor 24 and resistor 26. This produces a voltage pulse of fixed width across coil 32. Upon the occurrence of the event to be monitored, switch device 10 is transferred from the first or open condition to the second or closed condition causing a short circuit between points 12 and 14 thus discharging the capacitor. Upon the transfer of the condition of switch device 10 from the closed to the open condition, transistor 28 will again become conductive for a fixed period. During the periods of conduction of transistor 28, current pulses are conveyed through field coil 32 thus producing a magnetic flux field which is oriented according to the angular orientation of coil 32. The average magnitude of this flux field varies proportionally to the frequency of actuation of switching device 10 as shown by curve 46 of FIGURE 2. On the other hand, the flux produced by coils 34 and 36, being tied directly across the DC source 18, is substantially constant; i.e., constant to the same degree that the output of source 18 is constant. However, since all voltages are related to the magnitude of source 18, the fields produced by coils 34 and 36 may be regarded as constant for practical purposes.

Figure 3:
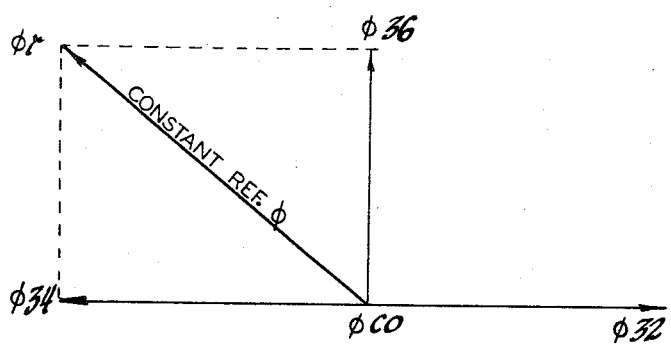
FIGURE 3 is a flux vector diagram showing the angular orientation of the resultant flux vector produced by the circuit of FIGURE 1.

As shown in the flux vector diagram of FIGURE 3, the variable flux vector $\phi_{32}$ produced by coil 32 extends in the east direction while $\phi_{34}$ produced by opposing reference coil 34 extends in the west direction. The reference flux $\phi_{36}$ produced by reference coil 36 is constant and extends in the north direction as shown. The resultant reference flux vector $\phi_r$ produced by the constant combination of $\phi_{34}$ and $\phi_{36}$ extends approximately in the northwest direction as shown in FIGURE 3. As the frequency of the event being monitored increases, the magnitude of the flux $\phi_{32}$ produced by coil 32 increases. As flux vector $\phi_{32}$ increases, the resultant flux vector of $\phi_{32}$, $\phi_{34}$ and $\phi_{36}$ rotates clockwise as shown in FIGURE 3. For example, when $\phi_{32}$ is zero the resultant flux vector is indicated by the northwest resultant vector shown in FIGURE 3. However, when $\phi_{32}$ equals $\phi_{34}$ the resultant flux vector aligns with $\phi_{36}$ in the north direction. Further increases of $\phi_{32}$ continue to rotate the resultant flux vector in the clockwise direction.

Figure 4:
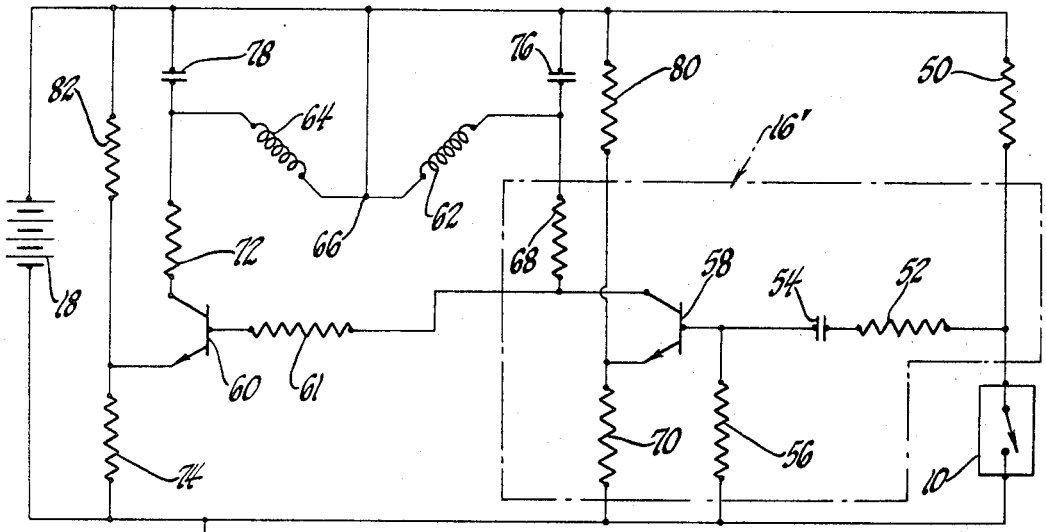
FIGURE 4 is a schematic diagram of a second embodiment of the invention.

Referring to FIGURE 4, a second embodiment of the invention is shown. This embodiment also is effective to produce a resultant magnetic flux vector the angular orientation of which varies according to the frequency of occurrence of an event being monitored. The embodiment of FIGURE 4 includes an input switching device 10 which takes one of the forms previously described with reference to FIGURE 1. The circuit further includes a source 18 of DC voltage having the negative terminal grounded as shown and the positive terminal connected through a resistor 50 to the input switching device 10. The circuit further includes a square wave generator generally designated at 16'. The square wave generator functions in the manner of the square wave generator 16 described with reference to FIGURE 1 and includes the series combination of resistor 50, resistor 52, a capacitor 54 and a resistor 56 which is connected to grounded point 14 as shown. Accordingly, when switch 10 is open, charging current flows through the RC charging circuit defined by the series combination of resistors 50, 52, capacitor 54 and resistor 56. During the flow of this charging current a first transistor stage 58 is rendered conductive by means of a base input signal which is applied to transistor 58 from capacitor 54. When switch 10 is closed, capacitor 54 is discharged to ground 14.

The combination of FIGURE 4 further includes a second transistor stage 60 which has the base electrode connected through a resistor 61 to the collector electrode of transistor 58. Transistor stages 58 and 60 are hence complementary in operation, which is to say that when one transistor is conductive the other is nonconductive. Therefore, in the manner described with reference to FIGURE 1, transistor stage 58 will be conductive for an average time which is related to the rate of occurrence of transfer of the condition of input switching device 10 from the closed to the open condition. The average value of the output of transistor stage 60 will be the complement of the output of transistor stage 58 inasmuch as the transistors are operated in a complementary fashion.

To take advantage of the reciprocal relation between the average value of the outputs of transistor stages 58 and 60, a pair of field coils 62 and 64 are connected to the transistor stages 58 and 60, respectively, so as to produce a resultant magnetic field which varies in angular orientation according to the ratio of the average value of the outputs of transistor stages 58 and 60. To this end, one end of each of field coils 62 and 64 is connected to a common junction 66 which is electrically connected to the positive terminal of source 18. The other end of coil 62 is connected through a resistor 68 to the collector electrode of transistor 58. Accordingly when transistor 58 is conductive a current path is defined from the positive terminal of source 18 to junction 66 through coil 62 and resistor 68 from the collector to the emitter of transistor 58 through a resistor 70 to ground 14.

Similarly, the other side of coil 64 is connected through a resistor 72 to the collector electrode of transistor stage 60. The emitter electrode of transistor stage 60 is connected through a resistor 74 to ground 14 as shown. Accordingly, when transistor stage 60 is conductive a current path is defined from the positive terminal of source 18 through coil 64, resistor 72, transistor stage 60 and resistor 74 to ground. Smoothing filters including capacitors 76 and 78 may be connected in circuit with the field coils 62 and 64 as shown. In addition, resistors 80 and 82 may be connected between source 18 and the emitters of transistors 58 and 60, respectively.

Figure 5:
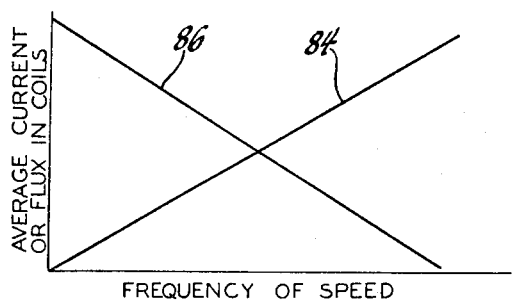
FIGURE 5 is a graphical representation of the average curent in the field coils of the circuit of FIGURE 4 as a function of the rate of occurrence of an event being monitored.

Describing the operation of the circuit shown in FIGURE 4, it can be seen by reference to FIGURE 5 that as the frequency of actuation of input switching device 10 increases, the average current through coil 62 increases (plot 84) while the average current through coil 64 decreases (plot 86) due to the complementary relation between transistor stages 58 and 60. Hence the magnetic fields produced by coils 62 and 64 vary in accordance with the crossing plots 84 and 86 shown in FIGURE 5. Looking to FIGURE 6 it may be seen that due to the orientation of coils 62 and 64 the flux vector $\phi_{62}$ produced by coil 62 lies in the northeasterly direction while the flux field of coil 64 identified as $\phi_{64}$ lies in the northwesterly direction.

Figure 6:
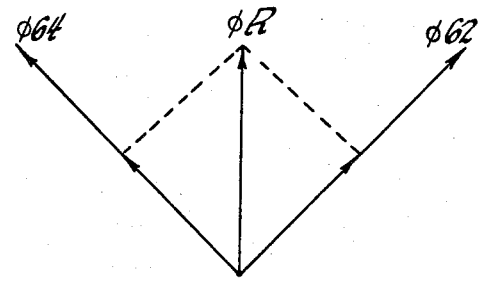
FIGURE 6 is a flux vector diagram indicating the angular orientation of the flux vector resultant of the circuit of FIGURE 4.

At zero rate of actuation of input switching device 10, transistor stage 60 is conductive causing the full current from source 18 to flow through coil 64 producing a resultant field which aligns with $\phi_{64}$ as shown in FIGURE 6. As the repetition rate of actuation of input switching device 10 increases from zero, $\phi_{64}$ decreases in magnitude while $\phi_{62}$ increases in magnitude causing the resultant flux vector to rotate in the clockwise direction as shown in FIGURE 6.

Figure 7:
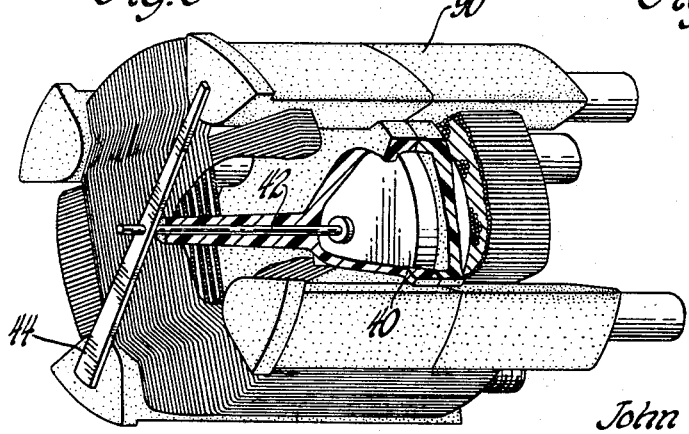
FIGURE 7 is an isometric view, partly broken away, of a preferred construction for the mounting means adapted for use with the circuits of FIGURES 1 and 4.

FIGURE 7 shows a preferred construction for the embodiments of FIGURES 1 and 4. In this construction, the coils may be wound on a plastic bobbin 90 having four radially projecting posts to accommodate the coils in orientation in which the axes of the coils intersect at right angles at a point which is concentric to both coils. The armature 40 is rotatably mounted on axle 42 at this concentric point so as to be angularly oriented in accordance with the resultant magnetic flux vector produced by the coils wound on bobbin 90. As shown, the axle 42 extends upwardly through the coils to accommodate a pointer 44 which is accordingly motivated by the armature 40. The armature 40, as well known to those skilled in the art, may be a flat disc of magnetic material which is diametrically magnetized. To accommodate the circuit of FIGURE 1, coils 32 and 34 may be wound in a bifilar fashion on one axis of the bobbin while coils 36 may be wound on the other axis of the bobbin. To accommodate the circuit of FIGURE 4, coils 62 and 64 may be simply wound on respective axes of the bobbin 90 shown in FIGURE 7.

While this invention has been described with reference to two specific embodiments thereof, it is to be understood that these embodiments are merely illustrative and that various modifications and additions will be apparent to those skilled in the art. The invention is defined by the following claims.

We claim:
1. Frequency indicating apparatus comprising a DC voltage source; the series combination of a capacitive element and a resistive element connected across the source; an input switch cyclically operable between conductive and nonconductive states and connected in shunt relation with the capacitive and resistive elements whereby the capacitive element is charged by the source when the switch is nonconductive and is discharged when the source is conductive; transistor switch means having two output electrodes and an input electrode; a field coil connected in series relation with the source and the output electrodes to complete a circuit through the coil when the transistor conducts across the output electrodes; the input electrode being connected to the capacitive element such that the transistor switch means is rendered conductive across the output electrodes for a fixed period during each full cycle of the operation of the switch; and magnetic armature means proximate the coil to be positioned by the field from the coil in relation to the strength of the field.

2. Apparatus as described in claim 1 further including at least one additional field coil connected across the source to be constantly energized thereby and producing a field which is angularly displaced from the field of the first-mentioned coil whereby the armature means is positioned by the resultant of the fields acting thereon.

3. Apparatus as defined in claim 1 further including second transistor switch means having an input electrode and a pair of output electrodes; the input electrode of the second transistor switch means being connected to an output electrode of the first mentioned transistor switch means to be conductive across the output electrodes only when the first transistor switch means is nonconductive across its output electrodes, a second field coil connected in series relation with the source and the output electrodes of the second transistor switch means to complete a circuit through the second coil when the second transistor switch means conducts across the output electrodes, said armature means being proximate both field coils to be positioned according to the relative strength of the fields produced by said coils.

References Cited

UNITED STATES PATENTS

| 2,178,108 | 10/1939 | Schwarze | 324—140 |
| 2,927,268 | 3/1960 | Haggai | 324—70 |
| 2,995,690 | 8/1961 | Lemon | 318—138 |
| 2,999,168 | 9/1961 | Henry | 324—70 |
| 3,174,088 | 3/1965 | Muller | 318—138 |
| 3,250,066 | 5/1966 | Engelhardt | 318—138 |
| 3,281,630 | 10/1966 | Liang | 318—138 |
| 3,327,208 | 6/1967 | Allen | 324—70 |
| 3,329,893 | 7/1967 | Lawless | 324—70 |

RUDOLPH V. ROLINEC, *Primary Examiner.*

M. J. LYNCH, *Assistant Examiner.*